(12) United States Patent
Kobayashi

(10) Patent No.: US 12,348,362 B2
(45) Date of Patent: *Jul. 1, 2025

(54) INFORMATION PROCESSING SYSTEM, MANAGEMENT APPARATUS, AND NON-TRANSITORY COMPUTER READABLE MEDIUM STORING PROGRAM

(71) Applicant: FUJIFILM Business Innovation Corp., Tokyo (JP)

(72) Inventor: Shinichi Kobayashi, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 765 days.

This patent is subject to a terminal disclaimer.

(21) Appl. No.: 17/403,107

(22) Filed: Aug. 16, 2021

(65) Prior Publication Data

US 2022/0311653 A1 Sep. 29, 2022

(30) Foreign Application Priority Data

Mar. 24, 2021 (JP) ................................. 2021-049504

(51) Int. Cl.
*G06F 15/173* (2006.01)
*H04L 9/40* (2022.01)
(Continued)

(52) U.S. Cl.
CPC ........ *H04L 41/069* (2013.01); *H04L 41/0686* (2013.01); *H04L 43/0811* (2013.01); *H04L 63/0272* (2013.01)

(58) Field of Classification Search
CPC ............... H04L 41/069; H04L 41/0686; H04L 43/0811; H04L 63/0272
See application file for complete search history.

(56) References Cited

U.S. PATENT DOCUMENTS 11,424,937 B2 * 8/2022 Kakutani ............... H04L 9/3247
2009/0287810 A1 * 11/2009 Jalava ................. H04L 12/4641
709/223
(Continued)

FOREIGN PATENT DOCUMENTS

| EP | 3 328 029 A1 | 5/2018 |
| JP | 2017-068835 A | 4/2017 |
| JP | 2020154802 A * | 9/2020 |

OTHER PUBLICATIONS

Feb. 14, 2022 Extend European Search Report issued in European Application No. 21192708.2.
(Continued)

*Primary Examiner* — Duyen M Doan
(74) *Attorney, Agent, or Firm* — Oliff PLC

(57) ABSTRACT

An information processing system includes: a first processor mounted on a server connected to a local network of an organization to which a user belongs, the server having a function of connecting a virtual private network; a second processor mounted on an information processing apparatus installed outside the local network; and a third processor mounted on a management apparatus installed outside the local network, the management apparatus being communicable with the server and the information processing apparatus, the third processor being configured to hold organization information comprising at least connection information corresponding to the organization in the management apparatus, the connection information being used for connection to the server, the second processor being configured to: acquire the connection information corresponding to the organization to which a user using the information processing apparatus belongs from the management apparatus; detect via the management apparatus that the organization to which the user belongs requests data communication with the information processing apparatus;

(Continued)

and connect a virtual private network between the server and the information processing apparatus using the connection information acquired from the management apparatus, and the first processor being configured to: recognize that the virtual private network is connected between the information processing apparatus and the server; and execute data communication with the information processing apparatus via the virtual private network.

15 Claims, 11 Drawing Sheets

(51) Int. Cl.
*H04L 41/0686* (2022.01)
*H04L 41/069* (2022.01)
*H04L 43/0811* (2022.01)

(56) References Cited

U.S. PATENT DOCUMENTS

| 2011/0093602 | A1 | 4/2011 | Coskun et al. |
| 2013/0003103 | A1* | 1/2013 | Barber ................. G06F 3/1288 |
| | | | 358/1.14 |
| 2015/0163377 | A1* | 6/2015 | Ge ...................... H04N 1/4426 |
| | | | 358/1.14 |
| 2017/0099178 | A1 | 4/2017 | Satoh |
| 2021/0248227 | A1* | 8/2021 | Yang ..................... G06F 21/606 |
| 2022/0141190 | A1* | 5/2022 | Olson ..................... H04L 45/22 |
| | | | 726/15 |

OTHER PUBLICATIONS

Oct. 22, 2024 Office Action issued in Japanese Patent Application No. 2021-049504.

* cited by examiner

FIG. 2

COMPANY INFORMATION

| COMPANY ID | VPN SERVER CONNECTION INFORMATION | ENCRYPTION KEY | OFFICE ID | VPN CONNECTION REQUEST FLAG | IN-CONNECTION FLAG |
|---|---|---|---|---|---|
| A | · SERVER ADDRESS<br>· PORT NUMBER<br>· AUTHENTICATION INFORMATION (ID, PASSWORD, CERTIFICATE, VPN SETTING) | | P | SET/RESET | SET/RESET |
| | | | Q | SET/RESET | SET/RESET |
| B | | | P | SET/RESET | SET/RESET |
| | | | Q | SET/RESET | SET/RESET |
| . . . | | | | | |

FIG. 6

COMPANY INFORMATION

| COMPANY ID | VPN SERVER CONNECTION INFORMATION | ENCRYPTION KEY | SETTING CONDITION | OFFICE ID | VPN CONNECTION REQUEST FLAG | IN-CONNECTION FLAG |
|---|---|---|---|---|---|---|
| A | • SERVER ADDRESS<br>• PORT NUMBER<br>• AUTHENTICATION INFORMATION (ID, PASSWORD, CERTIFICATE, VPN SETTING) | | CLOSING DATE: EACH FRIDAY<br>CLOSING TIME: 15:00 | P | SET/RESET | SET/RESET |
| | | | | Q | SET/RESET | SET/RESET |
| B | | | CLOSING DATE: 28TH OF EACH MONTH<br>CLOSING TIME: 18:00 | P | SET/RESET | SET/RESET |
| | | | | Q | SET/RESET | SET/RESET |
| ... | | | | | | |

FIG. 7

AUTHENTICATION LOG INFORMATION

| DATE AND TIME | OFFICE ID | USER ID | COMPANY ID |
|---|---|---|---|
|  |  |  |  | ized
INFORMATION PROCESSING SYSTEM, MANAGEMENT APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2021-049504 filed on Mar. 24, 2021.

BACKGROUND

Technical Field

The present disclosure relates to an information processing system, a management apparatus, and a non-transitory computer readable medium storing a program.

Related Art

In recent years, workplaces used by cross-company workers, freelancers, students, and the like, such as co-working spaces and shared offices, have been expanded along with reformation of work methods and spread of remote work. An administrator of a workplace installs a multifunction machine and the like having a print function and a FAX function in the workplace to provide a service to a user of the workplace.

An employee working at a company may also use the workplace. In this case, it would be convenient if the multifunction machine in the workplace may be connected to an in-house system via a network. However, in the case of network connection, a so-called virtual private network (VPN) may be established to exchange information via the VPN from a viewpoint of security.

When the employee performs a task using the multifunction machine installed in the workplace, log information related to the task is accumulated in the multifunction machine. The company side may want to acquire logs from the multifunction machine to centrally manage the work by the employee. However, there is a case where the company side may not directly access the multifunction machine.

Therefore, in the related art, a technique has been proposed in which a cloud server on a company side indirectly acquires logs from a multifunction machine installed in a workplace by mediating a log management server communicable with both the multifunction machine and the cloud server (for example, Patent Literature 1).

CITATION LIST

Patent Literature

Patent Literature 1: JP-A-2017-068835

SUMMARY

In a case where a log management server is used as in the related art since a server on an organization side may not directly acquire data from an information processing apparatus outside the organization, loads are concentrated on the log management server when a large number of apparatuses exchange data. Further, when the data to be exchanged is a confidential log as in the related art, it is not safe in terms of security to allow the log management server to even temporarily hold the data for mediation. Therefore, even when the server may not directly communicate data with the information processing apparatus, the server that acquires data by a method preferably may directly communicate data with the information processing apparatus via a virtual private network.

Aspects of non-limiting embodiments of the present disclosure relate to enabling a server to communicate data with an information processing apparatus via a virtual private network according to a request from an organization having the server even in a state where the server may not directly communicate data with the information processing apparatus due to a system environment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a first processor mounted on a server connected to a local network of an organization to which a user belongs, the server having a function of connecting a virtual private network; a second processor mounted on an information processing apparatus installed outside the local network; a third processor mounted on a management apparatus installed outside the local network, the management apparatus being communicable with the server and the information processing apparatus. The third processor is configured to hold organization information including at least connection information corresponding to the organization in the management apparatus, the connection information being used for connection to the server. The second processor is configured to: acquire the connection information corresponding to the organization to which a user using the information processing apparatus belongs from the management apparatus; detect via the management apparatus that the organization to which the user belongs requests data communication with the information processing apparatus; and connect a virtual private network between the server and the information processing apparatus using the connection information acquired from the management apparatus. The first processor is configured to: recognize that the virtual private network is connected between the information processing apparatus and the server; and execute data communication with the information processing apparatus via the virtual private network.

BRIEF DESCRIPTION OF THE DRAWINGS

Exemplary embodiment(s) of the present invention will be described in detail based on the following figures, wherein:

FIG. 2 shows a data configuration example of company information stored in a company information storage unit according to the first exemplary embodiment;

FIG. 6 shows a data configuration example of company information stored in a company information storage unit according to the second exemplary embodiment;

FIG. 7 shows a data configuration example of authentication log information stored in an authentication log information storage unit according to the second exemplary embodiment;

DETAILED DESCRIPTION

Hereinafter, preferred exemplary embodiments of the present disclosure will be described with reference to the drawings.

First Exemplary Embodiment

Figure 1:
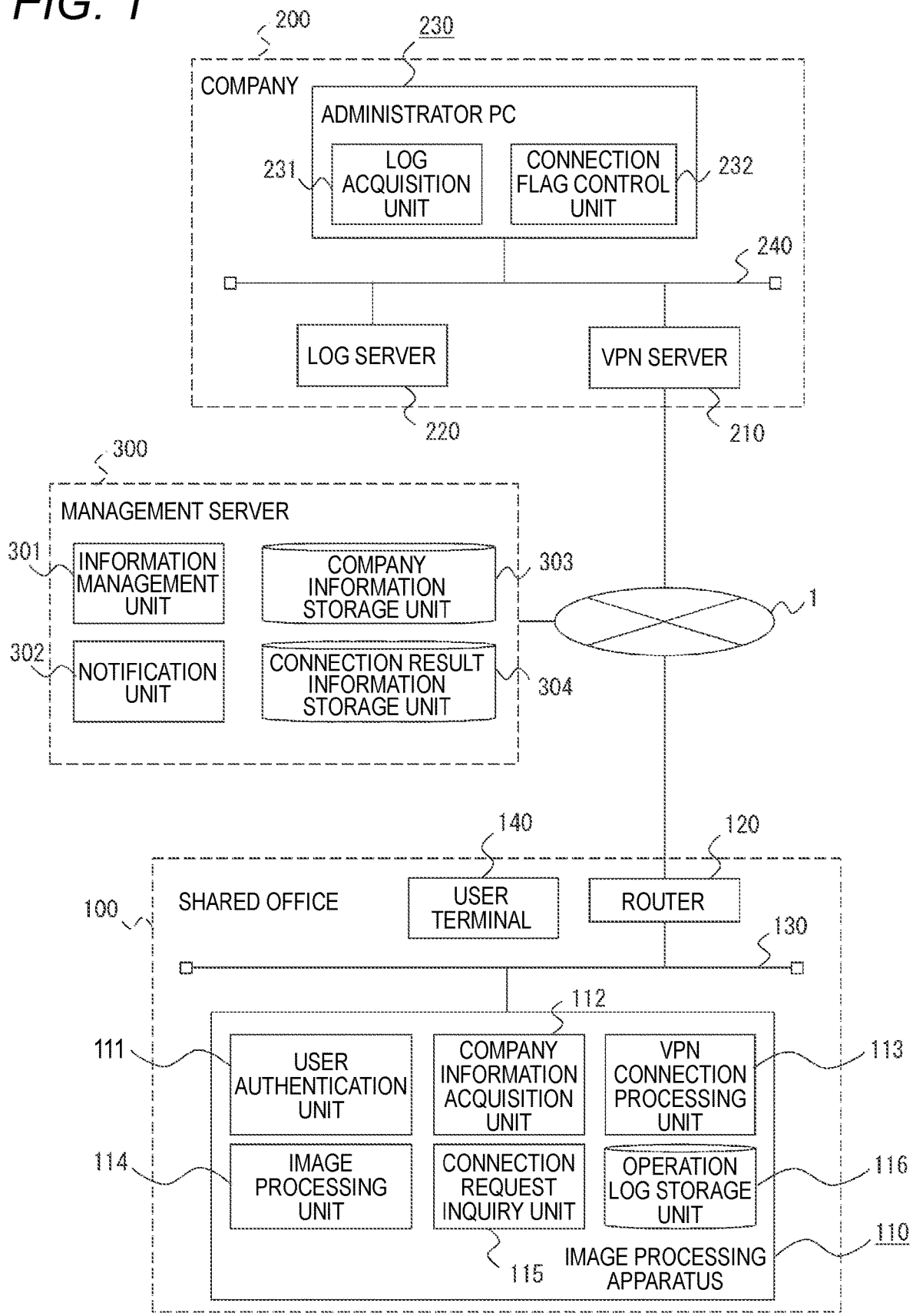
FIG. 1 shows a block configuration example of an information processing system according to a first exemplary embodiment.

FIG. 1 shows a block configuration example of an information processing system according to the first exemplary embodiment. FIG. 1 shows a configuration in which systems installed in a shared office 100 and a company 200 are connected via a network 1 configured by the Internet or the like. Further, a management server 300 installed outside both the shared office 100 and the company 200, for example, in a cloud, is further connected to the network 1. The information processing system according to the present exemplary embodiment may be implemented by combining computers or the like in the related art that are hardware. As to be described later, control of characteristic information processing according to the present exemplary embodiment is implemented by software operating on the computers.

The information processing system may include a local area network (LAN) system of plural shared offices 100 and a company LAN system of plural companies 200. Each of the plural shared offices 100 and the plural companies 200 may have a configuration to be described later. FIG. 1 shows one shared office 100 and one company 200. Only one management server 300 is provided in the information processing system. The management server 300 is provided in the cloud in the present exemplary embodiment. Alternatively, the management server 300 is not limited to the cloud as long as the management server 300 is accessible from each LAN system of the shared office 100 and the company 200.

The shared office 100 according to the present exemplary embodiment is shown as an example of a shared space. The "shared space" is a space in which plural users belonging to not the same organization are mixed. The term "organization" means a group constituted to achieve a specific object. In the present exemplary embodiment, a company will be described as an example of the organization. Therefore, in the following description, the "organization" and the "company" are used in the same meaning. Other examples of the organization include educational institutions such as universities.

In the shared office 100, the LAN system includes an image processing apparatus 110 and a router 120 connected to a LAN 130. A user terminal 140 is a personal computer (PC) that a user belonging to a company brings into the shared office 100. The user uses the user terminal 140 on an individual basis. It is apparent that the user terminal 140 is not limited to a PC and may be another terminal apparatus as long as the user terminal 140 may be connected to the image processing apparatus 110 as will be described later. The router 120 relays data exchanged between the image processing apparatus 110 and another apparatus having a communication function, that is, a VPN server 210 in the present exemplary embodiment.

The image processing apparatus 110, also referred to as an image forming apparatus, is a multifunction machine having various image processing functions such as a print function, a copy function, and a scanner function, and functions as an information processing apparatus including a computer therein. The image processing apparatus 110 includes a CPU that is a second processor, a ROM, a RAM, an HDD, a scanner that is an image reading device that reads an image on a medium such as a sheet, a print engine that is an image forming device that forms an image on the medium, an operation panel that receives an instruction from a user and displays information, and a network interface that connects a communication network such as the network 1. The image processing apparatus 110 may further include an external media interface that connects an external memory device such as a USB memory or a flash memory, and a wireless communication unit that performs short-range wireless communication with the user terminal 140.

The image processing apparatus 110 includes a user authentication unit 111, a company information acquisition unit 112, a VPN connection processing unit 113, an image processing unit 114, a connection request inquiry unit 115, and an operation log storage unit 116. Elements not used in the description of the present exemplary embodiment are omitted from the drawings.

The user authentication unit 111 performs user authentication of a user who uses the image processing apparatus 110. The company information acquisition unit 112 acquires, when the user logs in to the image processing apparatus 110, company information corresponding to a company to which the user belongs from the management server 300. The VPN connection processing unit 113 establishes VPN connection with the VPN server 210 of the company 200 to which the user belongs. In the present exemplary embodiment, connection between two parties, for example, connection between the image processing apparatus 110 installed in the shared office 100 and the VPN server 210 installed in the company 200 in a communicable manner by the VPN is referred to as "VPN connection". The VPN connection processing unit 113 disconnects the connected VPN in response to a cancellation request. The image processing unit 114 performs image processing in response to a request from the user. The connection request inquiry unit 115 periodically inquires of the management server 300 about the presence or absence of a VPN connection request from the company 200 side.

In the operation log storage unit 116, operation content of the user for using the image processing apparatus 110 is accumulated as an operation log. The operation log includes, in association with date and time information specifying date and time of the operation, identification information (hereinafter, referred to as "apparatus ID") on the image processing apparatus that executes image processing, identification information (hereinafter, referred to as "user ID")

on the user who performs the operation, and operation information indicating the operation content. A data configuration of the operation log itself may be the same as that of the related art.

The elements 111 to 115 in the image processing apparatus 110 are implemented by a cooperative operation of a computer mounted on the image processing apparatus 110 and a program executed by a CPU mounted on the computer. The operation log storage unit 116 is implemented by the HDD mounted on the image processing apparatus 110. Alternatively, the RAM or a storage unit of another information processing apparatus in the shared office 100 may be used via the LAN 130.

In the company 200, the company LAN system includes the VPN server 210, a log server 220, and an administrator PC 230 connected by a LAN 240. Another device which may be connected to the LAN 240 is not described in the description of the present exemplary embodiment and is thus omitted from the drawings.

The VPN server 210 according to the present exemplary embodiment may be implemented by a general-purpose hardware configuration in the related art. That is, the VPN server 210 includes a CPU that is a first processor, a ROM, a RAM, a hard disk drive (HDD) provided as a storage unit, a network interface provided as a communication unit, and the like. The log server 220 is the same server computer as the VPN server 210 and thus has the same configuration as the VPN server 210.

The VPN server 210 has a connection function for connecting a VPN in response to a VPN connection request from an external apparatus, which is called a VPN server function or a VPN router function, and performs VPN connection in response to a request from an external apparatus having a communication function, that is, the image processing apparatus 110 of the shared office 100 in the present exemplary embodiment. The log server 220 accumulates operation logs collected from the image processing apparatus 110 of the shared office 100.

The administrator PC 230 according to the present exemplary embodiment may be implemented by a general-purpose hardware configuration in the related art. That is, the administrator PC 230 includes a CPU, a ROM, a RAM, an HDD provided as a storage unit, a network interface provided as a communication unit, an input unit such as a mouse or a keyboard, and a user interface including a display unit such as a display.

The administrator PC 230 is a PC used by an administrator of the company 200 among PCs connected to the LAN 240. The administrator PC 230 includes an operation log acquisition unit 231 and a connection flag control unit 232. Elements not used in the description of the present exemplary embodiment are omitted from the drawings.

The operation log acquisition unit 231 acquires an operation log from the image processing apparatus 110 of the shared office 100 via the VPN. The connection flag control unit 232 controls set or reset of a VPN connection request flag held and managed in the management server 300. Specifically, in a case where the company 200 side wants to establish VPN connection when the company 200 is not in VPN connection with the image processing apparatus 110, the company 200 sets the VPN connection request flag held and managed by the management server 300. In a case where the company 200 wants to disconnect the VPN during VPN connection with the image processing apparatus 110, the VPN connection request flag is reset. Regarding flag information, 1 is generally set for setting the flag and 0 is generally set for resetting the flag, which may also be reversed.

The elements 231 and 232 in the administrator PC 230 are implemented by a cooperative operation of a computer installed in the administrator PC 230 and a program executed by a CPU mounted on the computer.

The management server 300 according to the present exemplary embodiment may be implemented by a general-purpose hardware configuration in the related art. That is, the management server 300 includes a CPU that is a third processor, a ROM, a RAM, an HDD provided as a storage unit, a network interface provided as a communication unit, and the like.

The management server 300 includes an information management unit 301, a notification unit 302, a company information storage unit 303, and a connection result information storage unit 304. Elements not used in the description of the present exemplary embodiment are omitted from the drawings.

The information management unit 301 manages information stored in the storage units 303 and 304, such as registration and update of information in accordance with information or an instruction acquired from outside. In response to a notification from the image processing apparatus 110 that the VPN connection with the VPN server 210 is established, the notification unit 302 records log information indicating content of the VPN connection as connection record information in the connection record information storage unit 304, and notifies the administrator PC 230 of the company 200 that the VPN connection is established.

FIG. 2 shows a data configuration example of company information stored in the company information storage unit 303 according to the present exemplary embodiment. The company information is set for each company 200 and includes a company ID, VPN server connection information, an encryption key, an office ID, a VPN connection request flag, and an in-connection flag. The company ID is identification information on the company 200. The VPN server connection information includes information necessary for the image processing apparatus 110 to establish VPN connection with the VPN server 210 of the company. The VPN server connection information includes a server address that is address information for specifying the VPN server 210 that is an access destination, and is basically an IP address. A port number is for connecting to the VPN server 210. Authentication information, which is information necessary for the image processing apparatus 110 to be authenticated by the VPN server 210 that is a connection destination, includes an ID, a password, a certificate issued by the VPN server 210, and a VPN setting including setting content related to communication via the VPN such as an encryption method and a protocol. The encryption key is used when an operation log is encrypted and then recorded in the operation log storage unit 116.

The office ID is identification information on the shared office 100. The VPN connection request flag and the in-connecting flag are set for each shared office. The VPN connection request flag is connection request flag information indicating the presence or absence of a VPN connection request between the VPN server 210 of the company 200 and the image processing apparatus 110 of the shared office 100. The presence or absence of the VPN connection request is indicated by the company 200 side, that is, the administrator in the present exemplary embodiment. The in-connection flag is flag information indicating whether the VPN server 210 of the company 200 and the image processing apparatus 110 of the shared office 100 are in VPN connection.

In the present exemplary embodiment, a case where only one image processing apparatus 110 is installed in each shared office 100 is described for convenience of description. Alternatively, if plural image processing apparatuses 110 are installed, the VPN connection request flag and the in-connection flag are set for each image processing apparatus in each shared office.

The elements 301 and 302 in the management server 300 are implemented by a cooperative operation of a computer installed in the management server 300 and a program executed by a CPU mounted on the computer. The storage units 303 and 304 are implemented by the HDD mounted on the management server 300. Alternatively, the RAM or a storage unit of another information processing apparatus in the cloud may be used.

Programs used in the present exemplary embodiment may be provided not only by a communication unit but also by being stored in a computer-readable recording medium such as a CD-ROM or a USB memory. Programs provided from a communication unit or a recording medium are installed in a computer, and a CPU of the computer sequentially executes the programs to implement various processing.

Next, operations in the present exemplary embodiment will be described.

First, it is assumed that an employee (hereinafter, referred to as a "user") of the company 200 moves to the shared office 100 and performs a task. At this time, the user brings the user terminal 140 into the shared office 100 and uses the user terminal 140. Hereinafter, processing performed when the user uses the image processing apparatus 110 installed in the shared office 100 will be described with reference to sequence diagrams shown in FIGS. 3A and 3B.

The connection request inquiry unit 115 of the image processing apparatus 110 periodically inquires of the management server 300 about the setting content of the VPN connection request flag corresponding to the shared office 100 managed by the company information storage unit 303 during the operation of the image processing apparatus 110 after activation, thereby monitoring the setting content of the VPN connection request flag. That is, the connection request inquiry unit 115 periodically obtains a state of the VPN connection request flag by so-called polling (step 100). Since polling is always performed, polling (step 100) is indicated by a broken line along a time axis of the image processing apparatus 110 in FIGS. 3A and 3B. A timing at which the connection request inquiry unit 115 inquires of the management server 300 may be different for each shared office 100 and for each image processing apparatus 110.

The information management unit 301 of the management server 300 replies the state of the VPN connection request flag of the shared office 100 included in the company information storage unit 303, that is, the set or reset, in response to the inquiry from the connection request inquiry unit 115. Processing according to the state of the VPN connection request flag will be described later.

For the user to use the image processing apparatus 110, the user needs to log in to the image processing apparatus 110. For example, in a case where the image processing apparatus 110 includes a card reader (not shown), the user holds an IC card acquired by being registered as a user of the shared office 100 over the card reader. The card reader reads user authentication information including a user ID and a password and a company ID of a company to which the user belongs from the IC card held over the card reader (step 101).

An example is shown in which the image processing apparatus 110 acquires information necessary for login or the like using a card reader. Alternatively, the present disclosure is not limited thereto, and for example, the user may be allowed to operate an operation panel of the image processing apparatus 110 so that the user authentication information and the company ID necessary for the subsequent processing are acquired.

The user authentication unit 111 performs user authentication by comparing the acquired user authentication information with user authentication information on each user of the shared office 100 registered in advance in a user database (not shown) (step 102). Here, when the description is continued on an assumption that the user authentication is successful, the user logs in to the image processing apparatus 110 due to the success of the user authentication (step 103).

Subsequently, the company information acquisition unit 112 of the image processing apparatus 110 transmits an information acquisition request including the acquired company ID to the management server 300 (step 104).

When the information management unit 301 of the management server 300 receives the information acquisition request from the image processing apparatus 110, the information management unit 301 extracts the VPN server connection information and the encryption key corresponding to the company ID included in the information acquisition request from the company information storage unit 303 and returns the VPN server connection information and the encryption key (step 105).

When the VPN server connection information and the encryption key are acquired from the management server 300, the VPN connection processing unit 113 of the image processing apparatus 110 transmits a VPN connection request including authentication information to the server address and the port number included in the VPN server connection information (step 106).

When the VPN server 210 that is the destination of the VPN connection request receives the VPN connection request from the image processing apparatus 110, the VPN server 210 authenticates the image processing apparatus 110 based on the authentication information included in the request (step 107). Here, when the description is continued on an assumption that the authentication is successful, the VPN server 210 returns a connection permission in response to the VPN connection request.

As described above, the image processing apparatus 110 establishes VPN connection with the VPN server 210 owned by the company to which the user holding the IC card belongs (step 108).

When the VPN is connected, the VPN connection processing unit 113 designates the company ID acquired at the time of user login, which is the company ID of the connection destination, and the office ID of the own shared office 100, and transmits change content of a connection state of the VPN, that is, a notification indicating that the VPN is connected, to the management server 300 (step 109).

In the present exemplary embodiment, a case where only one image processing apparatus 110 is installed in each shared office 100 is described as an example for convenience of description. Alternatively, if plural image processing apparatuses 110 are installed, it is necessary to further notify that the VPN is connected including apparatus IDs of image processing apparatuses 110 in VPN connection.

When the information management unit 301 receives the notification that the VPN is connected, the information management unit 301 sets an in-connection flag corresponding to the office of the company (step 110). In order to manage a result of the VPN connection, the information management unit 301 may generate connection result information and register the connection result information in the connection result information storage unit 304. The connection result information includes a fact that the VPN is connected, date and time information on the VPN connection, and a set of the shared office 100 and the company 200 respectively including the image processing apparatus 110 and the VPN server 210 that are in VPN connection.

Subsequently, the notification unit 302 may designate the office ID of the shared office 100 and transmit the change content of the connection state of the VPN, that is, the notification indicating that the VPN is connected, to the administrator PC 230 of the company 200 (step 111). Upon receiving the notification, the administrator knows that an operation log may be collected from the image processing apparatus 110 via the VPN.

After the login, the user operates the image processing apparatus 110 to perform image processing such as printing or copying using the image processing apparatus 110 (step 112). The image processing unit 114 executes image processing in accordance with the user operation (step 113). Then, the image processing unit 114 records the content of the executed image processing in the operation log storage unit 116 as an operation log. At this time, the operation log is encrypted and then recorded from the viewpoint of security (step 114).

The user may perform image processing by cooperating the user terminal 140 brought into the shared office 100 with the image processing apparatus 110 using a wireless communication method such as Bluetooth (registered trademark) or Wi-Fi (registered trademark). The user may access a data file stored in the LAN system of the company 200 via the connected VPN to perform the image processing.

Figure 3A:
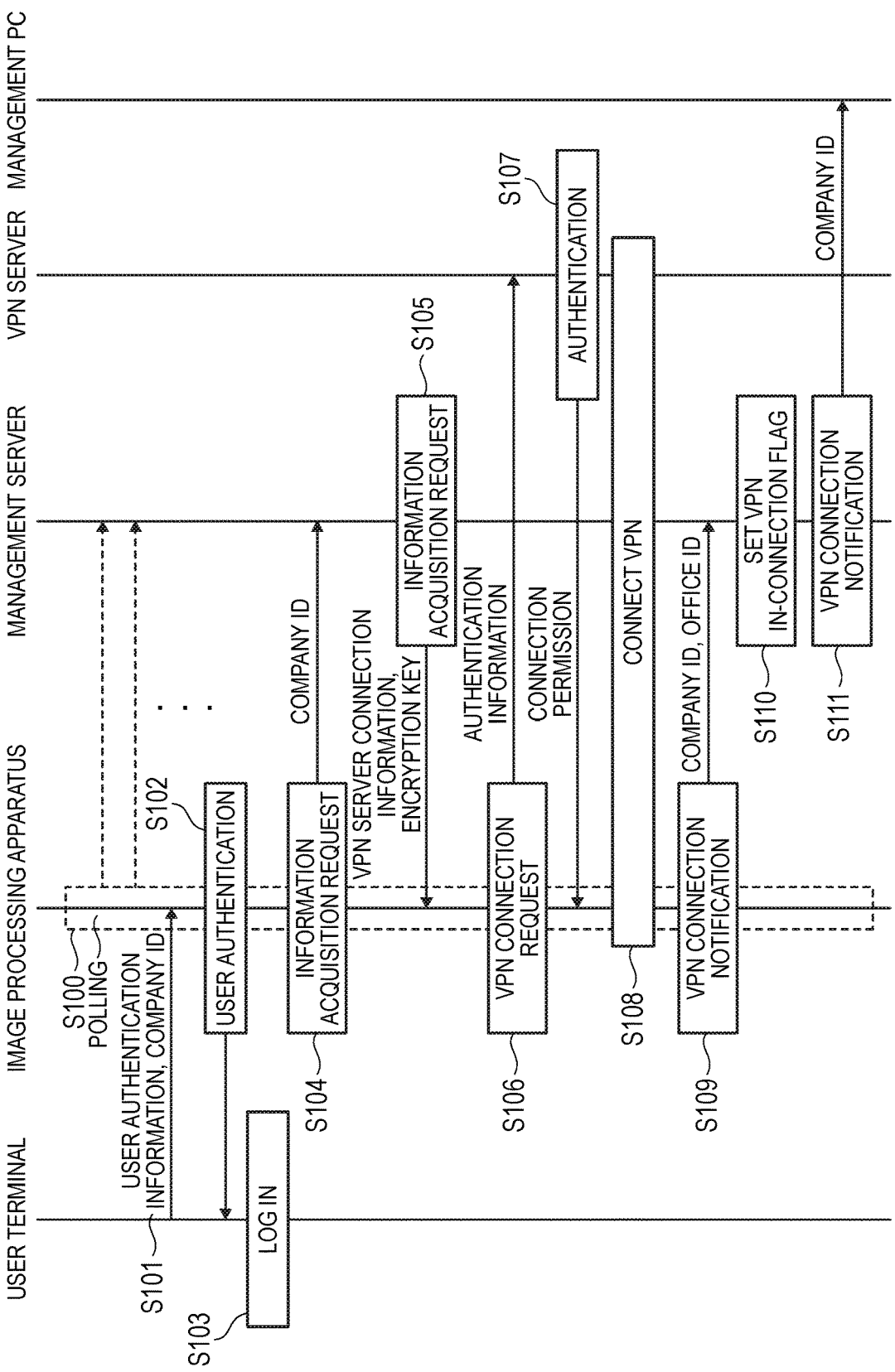
FIG. 3A is a sequence diagram showing processing performed when a user uses an image processing apparatus installed in a shared office according to the first exemplary embodiment.
Figure 3B:
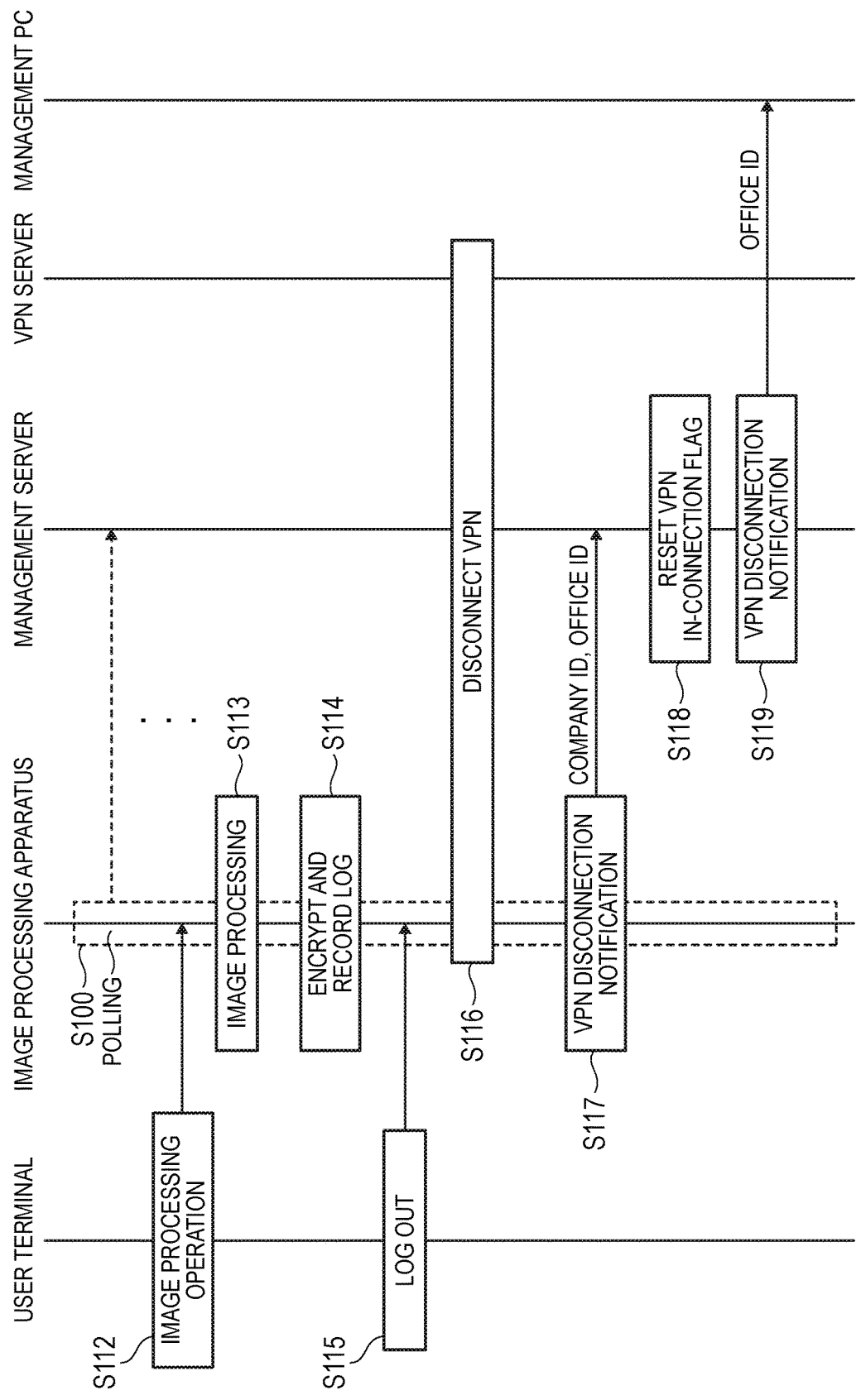
FIG. 3B is a sequence diagram following FIG. 3A.

Although omitted in FIG. 3B, processing of steps 112 to 114 is repeatedly executed by the user operation.

When the user finishes using the image processing apparatus 110 and logs out (step 115), the VPN connection processing unit 113 disconnects the VPN (step 116). Subsequently, the VPN connection processing unit 113 designates the company ID acquired at the time of user login, which is the company ID of the connection destination, and the office ID of the own shared office 100, and transmits change content of the connection state of the VPN, that is, a notification indicating that the VPN is disconnected, to the management server 300 (step 117).

In response to the notification from the VPN connection processing unit 113, the information management unit 301 resets the in-connection flag corresponding to the office of the company (step 118). In order to manage a result of the VPN disconnection, the information management unit 301 may generate connection result information and register the connection result information in the connection result information storage unit 304. The connection result information includes a fact that the VPN is disconnected, date and time information on the VPN disconnection, and a set of the shared office 100 and the company 200 respectively including the image processing apparatus 110 and the VPN server 210 that are disconnected from the VPN connection.

Subsequently, the notification unit 302 may designate the office ID of the shared office 100 and transmit the change content of the connection state of the VPN, that is, the notification indicating that the VPN is disconnected, to the administrator PC 230 of the company 200 (step 119). Upon receiving the notification, the administrator knows that an operation log may not be collected from the image processing apparatus 110 via the VPN.

When the user logs out, information on the user and the company to which the user belongs, which is referred to by the image processing apparatus 110, is temporarily unnecessary. For this reason, the image processing apparatus 110 may delete the corresponding information from the viewpoint of security.

In the present exemplary embodiment, when the image processing apparatus 110 is used as described above, the operation log is accumulated in the operation log storage unit 116.

Figure 4A:
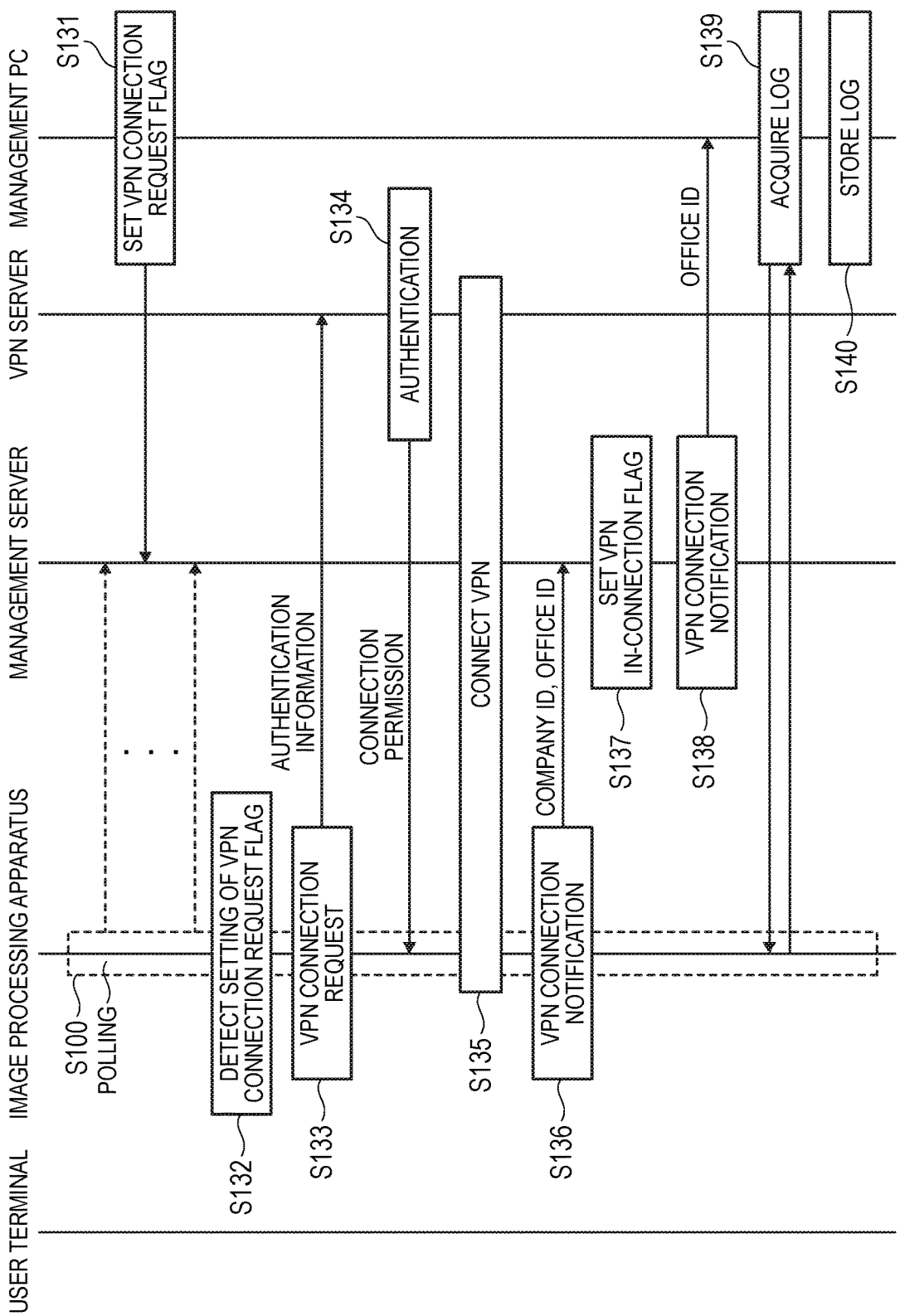
FIG. 4A is a sequence diagram showing processing for an administrator of a company to acquire an operation log accumulated in the image processing apparatus according to the first exemplary embodiment.
Figure 4B:
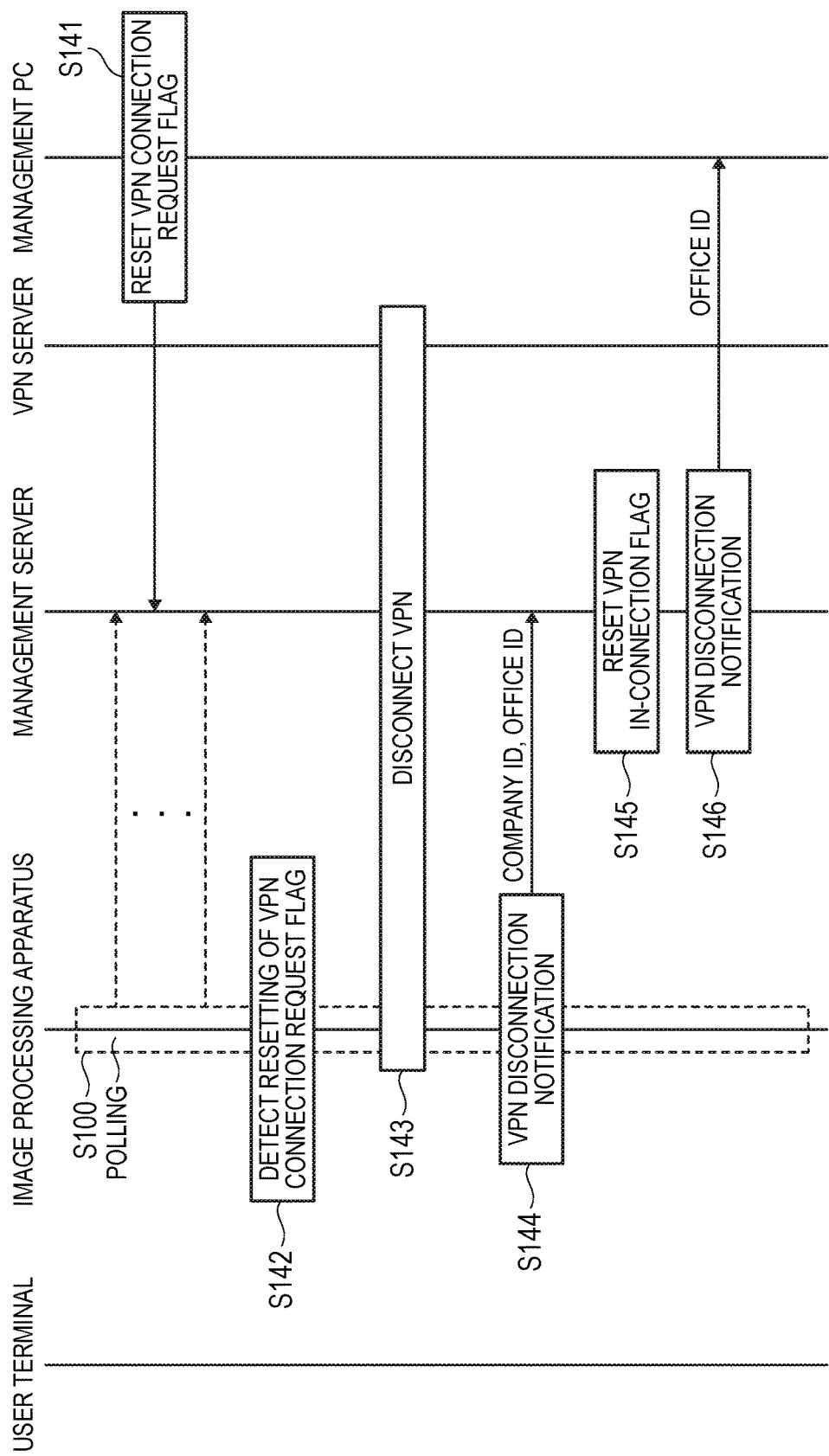
FIG. 4B is a sequence diagram following FIG. 4A.

Next, processing for the administrator of the company 200 to acquire operation logs accumulated in the image processing apparatus 110 will be described with reference to sequence diagrams shown in FIGS. 4A and 4B.

When the administrator wants to acquire the operation log from the image processing apparatus 110 at a desired timing, the connection flag control unit 232 of the administrator PC 230 accesses the company information storage unit 303 of the management server 300 in response to an operation of the administrator, and sets the VPN connection request flag corresponding to the office in which the image processing apparatus 110 that is the acquisition destination is installed (step 131). The connection flag control unit 232 may set the VPN connection request flag by instructing the information management unit 301.

As described above, the connection request inquiry unit 115 periodically obtains the state of the VPN connection request flag of the own shared office by polling. Therefore, when the connection request inquiry unit 115 detects that the VPN connection request flag is set (step 132), the company information acquiring unit 112 transmits a VPN connection request including authentication information to the server address and the port number included in the VPN server connection information of the company corresponding to the set VPN connection request flag (step 133). The VPN server connection information may be acquired from the management server 300 when the connection request inquiry unit 115 responds to the polling, or that the information processing request may be separately transmitted as in step 104.

Processing of steps 133 to 138 may be the same as those of the steps 106 to 111 described above and accordingly, the description thereof will be omitted.

The connection request inquiry unit 115 periodically executes polling. Therefore, when polling is executed during a period from when the administrator PC 230 sets the VPN connection request flag in step 131 to when the administrator PC 230 resets the VPN connection request flag in step 141, it is determined from the state of the VPN connection request flag that the VPN connection is requested from the company 200 side, and the VPN connection processing unit 113 attempts to execute VPN connection processing (steps 133 to 135) even though the connection is in progress. Therefore, even when the VPN connection request flag is set, the information management unit 301 replies that the VPN is in connection instead of the VPN server connection information if the in-connection flag is set. In other words, only when the VPN connection request flag is set and the in-connection flag is reset, the information management unit 301 returns that the VPN connection is requested, that is, the VPN server connection information, to the connection request inquiry unit 115. Accordingly, the VPN connection processing unit 113 does not need to perform the VPN connection processing again during the VPN connection.

When the VPN connection with the image processing apparatus 110 is known upon receiving the notification from the management server 300, a predetermined operation log acquisition operation is performed. The operation log acquisition unit 231 transmits an operation log acquisition request to the image processing apparatus 110 in response to the operation, acquires the operation log transmitted from the image processing apparatus 110 via the VPN in response to the acquisition request (step 139), and stores the operation log in the log server 220 (step 140). For the operation log to be acquired, an operation log after a most recently acquired operation log is acquired by referring to a recording state or the like of the log server 220. This is efficient since the operation log does not have to be acquired redundantly. Since the operation log accumulated in the image processing apparatus 110 is encrypted, an operation log decrypted with a decryption key corresponding to the encryption key used for encryption may be easily distinguished from the operation log of the own company.

When the operation log is acquired as described above, the connection flag control unit 232 accesses the company information storage unit 303 of the management server 300 according to the operation of the administrator, and resets the VPN connection request flag corresponding to the office in which the image processing apparatus 110 from which the acquisition of the operation log is ended is installed (step 141). The connection flag control unit 232 may reset the VPN connection request flag by instructing the information management unit 301.

As described above, the connection request inquiry unit 115 periodically obtains the state of the VPN connection request flag of the own shared office by polling. Therefore, when the connection request inquiry unit 115 detects that the VPN connection request flag is reset (step 142), the VPN connection processing unit 113 disconnects the VPN (step 143). The fact that the VPN is disconnected is notified to the management server 300. The subsequent processing of steps 144 to 146 may be the same as those of steps 117 to 119 described above, and thus the description thereof will be omitted.

According to the present exemplary embodiment as described above, when the image processing apparatus 110 is not in VPN connection with the VPN server 210, the administrator PC 230 on the company 200 side operates autonomously in response to an instruction from the administrator and sets the VPN connection request flag held and managed by the management server 300 even when the company 200 side may not acquire the operation log. Accordingly, the VPN connection with the image processing apparatus 110 may be established and the VPN server 210 may perform data communication with the image processing apparatus 110 via the VPN. As a result, the company 200 may acquire the operation log recorded when the user belonging to the company 200 uses the image processing apparatus 110 in the shared office 100.

Since the administrator may know that the VPN is connected by the notification in step 111, the administrator may acquire the operation log via the connected VPN without setting the VPN connection request flag in step 131 if the VPN is connected.

Second Exemplary Embodiment

Figure 5:
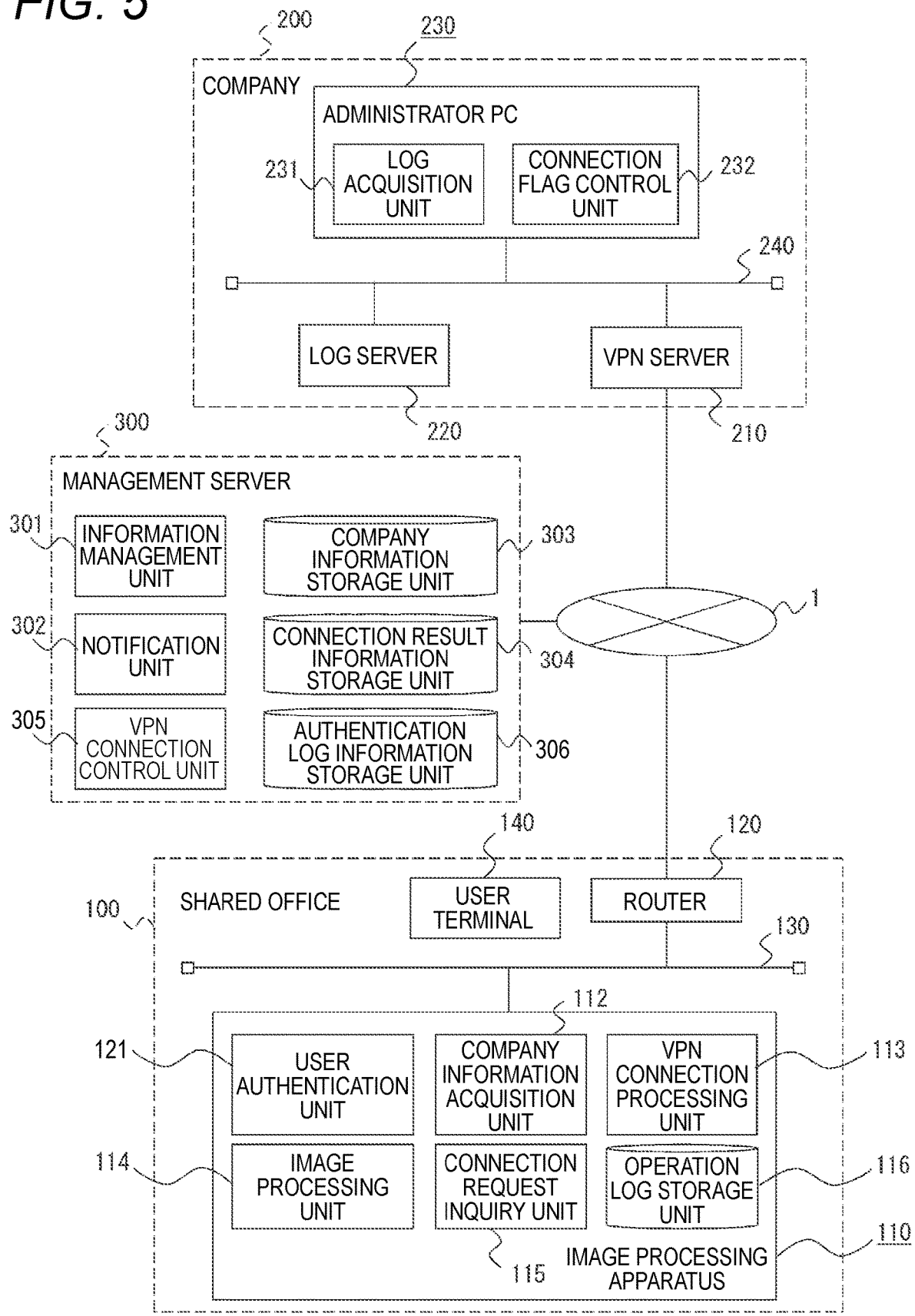
FIG. 5 shows a block configuration example of an information processing system according to a second exemplary embodiment.

FIG. 5 shows a block configuration example of an information processing system according to the present exemplary embodiment. In FIG. 5, the same elements as those in FIG. 1 described in the first exemplary embodiment are denoted by the same reference numerals, and the description thereof will be appropriately omitted. The information processing system according to the present exemplary embodiment includes, in addition to the configuration described in the first exemplary embodiment, a VPN connection control unit 305 and an authentication log information storage unit 306 in the management server 300.

In the first exemplary embodiment, the setting of the VPN connection request flag included in the company information is changed by the administrator PC 230 that operates autonomously. In contrast, in the present exemplary embodiment, the VPN connection control unit 305 changes the setting according to setting content of a setting condition to be described later.

FIG. 6 shows a data configuration example of company information stored in the company information storage unit 303 according to the present exemplary embodiment. In the company information, a setting condition is added to the items described in the first exemplary embodiment. The setting condition is an information item set by the company 200, and is thus set for each company. It is apparent that the setting condition may be set for each image processing apparatus, each company, and each shared office. In the setting condition, a timing of setting the VPN connection request flag designated by the company 200 is set.

FIG. 7 shows a data configuration example of authentication log information stored in the authentication log information storage unit 306 according to the present exemplary embodiment. The authentication log information is generated each time user authentication is performed by the user authentication unit 111 in the shared office 100, and is recorded in the authentication log information storage unit 306. The authentication log information includes date and time, an office ID, a user ID, and a company ID. The date and time are date and time when user authentication is performed. The office ID is an office ID of the shared office 100 in which user authentication is performed. The user ID is a user ID of a user who is authenticated. The company ID is a company ID of a company to which the user belongs.

Next, an operation in the present exemplary embodiment will be described.

Figure 8:
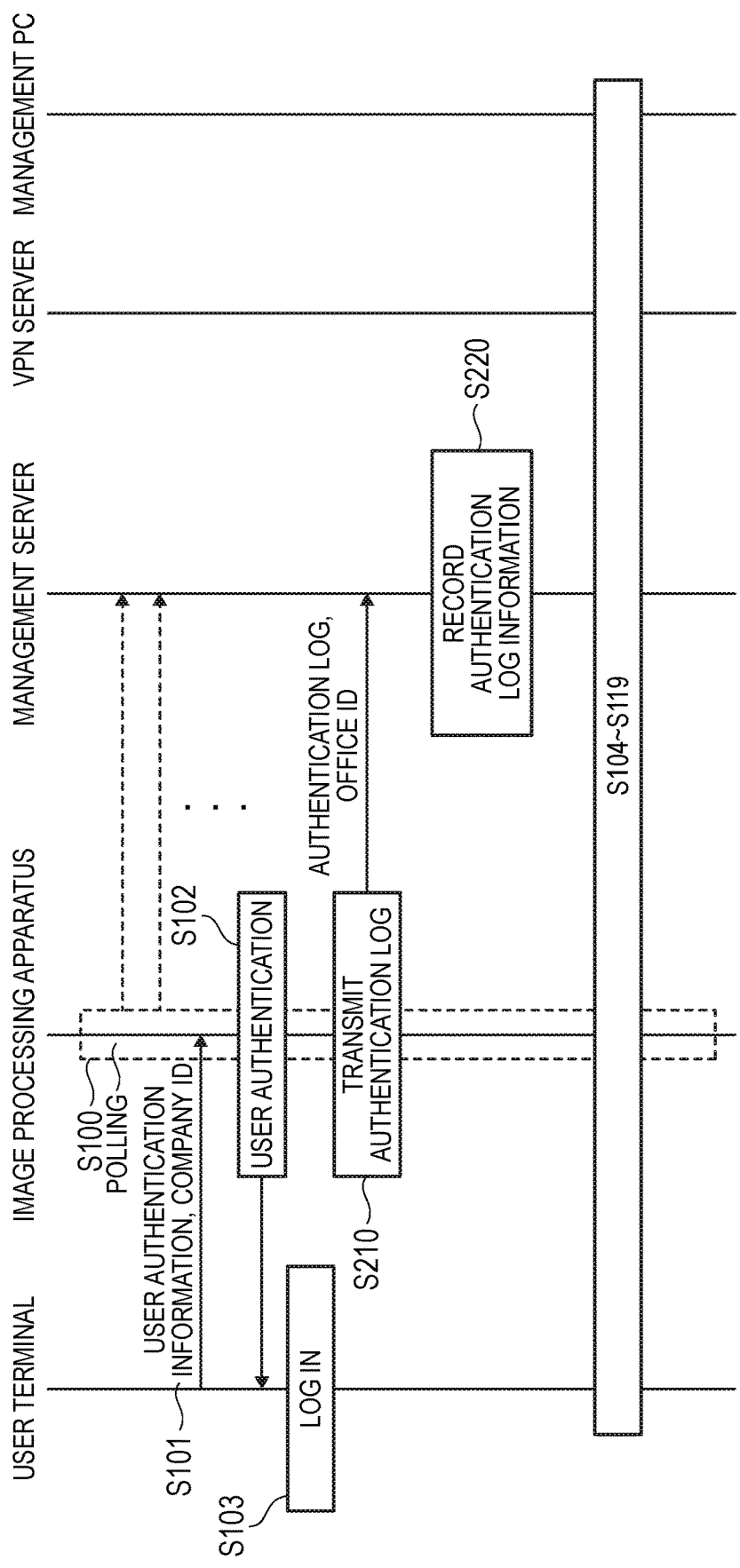
FIG. 8 is a sequence diagram showing processing performed when a user uses an image processing apparatus installed in a shared office according to the second exemplary embodiment.

First, processing performed when the user uses the image processing apparatus 110 installed in the shared office 100 will be described with reference to a sequence diagram shown in FIG. 8. The same processing as that shown in FIGS. 3A and 3B used for the description of the first exemplary embodiment is denoted by the same step number, and the description thereof will be omitted as appropriate.

The processing in the present exemplary embodiment may be basically the same as the processing described with reference to FIGS. 3A and 3B. In the present exemplary embodiment, as in the first exemplary embodiment, the connection request inquiry unit 115 in the image processing apparatus 110 periodically inquires of the management server 300 about the setting content of the VPN connection request flag during the operation of the image processing apparatus 110 (step 100).

When the user logs in to the image processing apparatus 110 in the same manner as in the first exemplary embodiment (steps 101 to 103) and succeeds in logging in, the user authentication unit 111 adds the office ID of the own shared office to an authentication log and transmits the authentication log to the management server 300 (step 210).

The information management unit 301 in the management server 300 generates the authentication log information including the authentication log and the office ID transmitted from the image processing apparatus 110, and records the authentication log information in the authentication log information storage unit 306 (step 220). The subsequent processing (steps 104 to 119) may be the same as that of the first exemplary embodiment, and thus the description thereof will be omitted.

Figure 9:
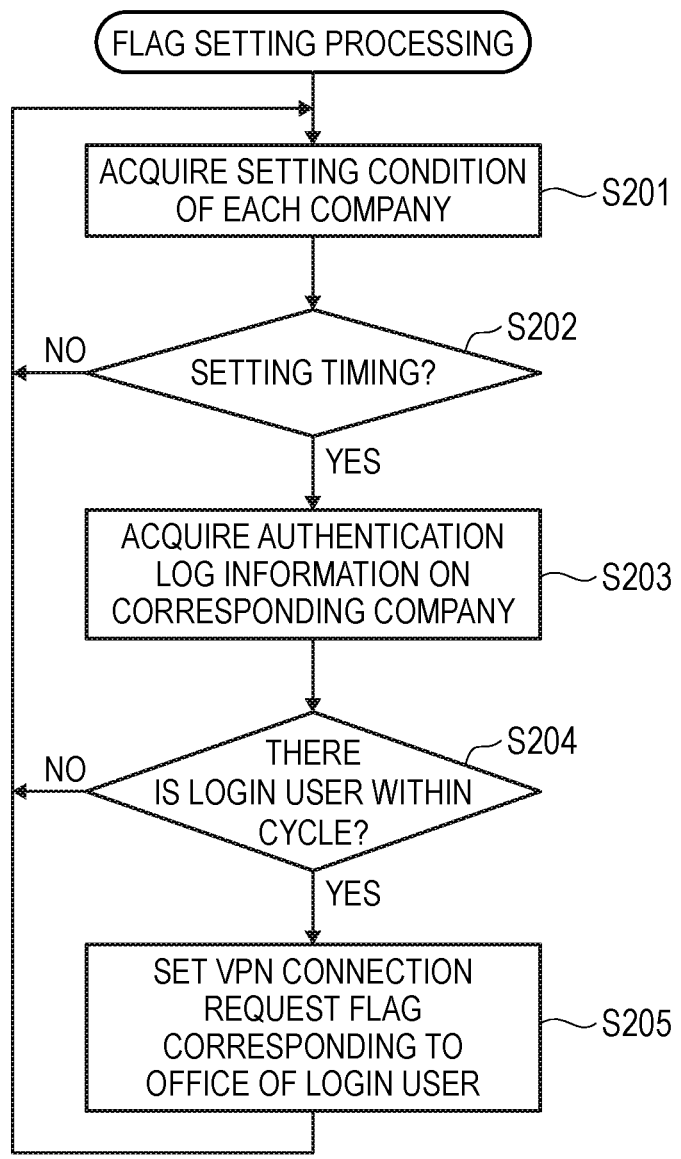
FIG. 9 is a flowchart showing flag setting processing performed by a VPN connection control unit according to the second exemplary embodiment.

Next, processing for the administrator of the company 200 to acquire an operation log accumulated in the image processing apparatus 110 will be described. The processing in the present exemplary embodiment may be the same as the processing shown in FIGS. 4A and 4B described in the first exemplary embodiment. However, in the first exemplary embodiment as described above, the VPN connection request flag is set at a desired timing when the administrator PC 230 operates autonomously (step 131 in FIG. 4A). In contrast, in the present exemplary embodiment, the VPN connection control unit 305 sets the VPN connection request flag in accordance with a setting condition set in advance without performing step 131. That is, the processing for acquiring the operation log in the present exemplary embodiment is different from the processing shown in FIGS. 4A and 4B in that the VPN connection control unit 305 operates without performing step 131. Hereinafter, flag setting processing performed by the VPN connection control unit 305 according to the present exemplary embodiment will be described with reference to a flowchart shown in FIG. 9.

The VPN connection control unit 305 is always operating during operation of the management server 300. The VPN connection control unit 305 acquires the setting condition of each company 200 set in the company information storage unit 303 (step 201). Then, the setting content of each setting condition is compared with information on the current time, specifically, information such as date, day of the week, and time. The comparison with the setting condition of each company 200 is repeated until the current time matches the setting condition, that is, until the timing of setting the VPN connection request flag is reached (N in step 202). Then, when there is a company 200 whose current time is the timing for setting the VPN connection request flag (Y in step 202), the VPN connection control unit 305 acquires authentication log information corresponding to the company 200 whose current time is the timing matching the setting condition (step 203). Subsequently, the VPN connection control unit 305 acquires the authentication log information corresponding to the company 200 from the authentication log information storage unit 306 (step 203). What is acquired may be only the authentication log information in a most recent cycle that may be specified from the setting condition. For example, if the setting condition is set to be each Friday, the "authentication log information in the most recent cycle" is the authentication log information in which the date and time included in the authentication log information is within the most recent week. More strictly speaking, in a case of the company 200 having a company ID "A" shown in FIG. 6 (hereinafter, referred to as "company A"), the authentication log information is authentication log information based on user authentication from 15:00 on Friday of a last week to the current time (that is, 15:00 on Friday that is the current time).

Then, the VPN connection control unit 305 refers to the office ID set in the acquired authentication log information. Here, when there is a shared office 100 whose office ID is not included in any of the acquired authentication log information among plural shared offices 100, it is understood that the employee of the company has not logged in to the image processing apparatus 110 installed in the shared office 100, that is, the employee of the company has not used the image processing apparatus 110. Since the image processing apparatus 110 has not been used, the operation log corresponding to the company 200 is not recorded in the operation log storage unit 116. For this reason, it is not necessary to acquire the operation log from the shared office 100, and accordingly it is not necessary to connect the VPN. That is, since there is no login user within the cycle of acquiring the operation log (N in step 204), the VPN connection control unit 305 does not set the VPN connection request flag corresponding to the shared office 100 of the company 200.

On the other hand, the image processing apparatus 110 installed in the shared office 100 whose office ID is included in the acquired authentication log information may be logged in and used by the employee of the company 200. Therefore, since there is a login user within the cycle of acquiring the operation log (Y in step 204), the VPN connection control unit 305 sets the VPN connection request flag corresponding to the shared office 100 of the company 200. Accordingly, the connection request inquiry unit 115 in the image processing apparatus 110 of the shared office 100 detects that the VPN connection request flag is set as described with reference to FIG. 4A (step 132). The processing (steps 133 to 146) after the setting of the VPN connection request flag is detected may be the same as that of the first exemplary embodiment, and thus the description thereof will be omitted. Here, a specific example will be described.

As shown in FIG. 6, in the setting condition of the company 200 having a company ID "B" (hereinafter, "company B"), the closing date is set to 28th of each month and the closing time is set to 18:00. Here, when the current date is 28th of a certain month and the current time is 18:00, it is the timing of setting the VPN connection request flag in the company B. In this case (Y in step 202), the VPN connection control unit 305 acquires the authentication log information of the company B for a most recent month with reference to the time interval of the setting condition (that is, 28 h of each month) (step 203). Here, it is assumed that the company B may use the shared office 100 having the office ID "P" (hereinafter, "office P") and the shared office 100 having the office ID "Q" (hereinafter, "office Q") according to the contract. If the office ID of the office P is not included in office IDs of the authentication log information for the most recent month of the company B, it means that the employee of the company B has not logged in to the image processing apparatus 110 of the office P. That is, the employee of the company B has not used the image processing apparatus 110, and accordingly it may be seen that the operation log to be acquired is not recorded in the image processing apparatus 110 of the office P. In this manner, when there is no login user within the cycle of acquiring the operation log (that is, within the most recent month) in the company B that may be specified by referring to the setting condition (N in step 204), it is not necessary to acquire the operation log from the image processing apparatus 110 in the office P, and thus the VPN connection control unit 305 does not set the VPN connection request flag corresponding to the office P of the company B.

On the other hand, when the office ID of the office Q is included in the office IDs of the authentication log information for the most recent month of the company B, an employee of the company B has logged in to the image processing apparatus 110 of the office Q, and thus the image processing apparatus 110 of the office Q may be used by the employee of the company B. In this manner, when there is a login user within the cycle of acquiring the operation log in the company B that may be specified by referring to the setting condition (Yin step 204), the VPN connection control unit 305 sets the VPN connection request flag corresponding to the office Q of the company B (step 205). Accordingly, the connection request inquiry unit 115 in the image processing apparatus 110 in the office Q detects that the VPN connection request flag is set (step 132), and the VPN connection processing unit 113 establishes VPN connection with the VPN server 210 of the company B (steps 133 to 135). Accordingly, the administrator of the company B may acquire the operation log of the company B from the office Q by operating the administrator PC 230 (step 139).

The VPN connection request flag is reset by the administrator PC 230 as in the first exemplary embodiment (step 141).

According to the present exemplary embodiment, the setting of the VPN connection request flag is automatically and repeatedly executed by the management server 300 without causing the administrator to instruct the setting each time.

In the present exemplary embodiment, time is set as the setting condition. However, for example, as in the setting example of the company B, polling is not always performed from the image processing apparatus 110 just at 18:00. Therefore, measures may be taken such as giving a margin to the time set to the setting condition in consideration of the cycle of polling. Further, as in the first exemplary embodiment, the VPN in-connection flag may be referred so that the VPN connection would not be duplicated.

In the present exemplary embodiment, an example in which a condition related to time is set as the setting condition is described. However, the setting condition does not need to be limited to the condition related to time. For example, the VPN connection request flag may be set when an amount of information accumulated in the authentication log information storage unit 306 is referred to and reaches a predetermined threshold value. In this case, it may be expected that operation logs are accumulated to some extent, and thus the company 200 side may acquire the operation logs after the operation logs are accumulated to a certain extent.

In the above exemplary embodiments, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the above exemplary embodiments, the term "processor" is broad enough to encompass one processor or plural processors in collaboration that are located physically apart from each other but may work cooperatively. The order of operations of the processor is not limited to one described in the above exemplary embodiments, and may be changed as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first processor mounted on a server connected to a local network of an organization to which a user belongs, the server having a function of connecting a virtual private network;
a second processor mounted on an information processing apparatus installed outside the local network; and
a third processor mounted on a management apparatus installed outside the local network, the management apparatus being communicable with the server and the information processing apparatus,
wherein the third processor is configured to hold organization information comprising at least connection information corresponding to the organization in the management apparatus, the connection information being used for connection to the server,
wherein the second processor is configured to:
acquire the connection information corresponding to the organization to which a user using the information processing apparatus belongs from the management apparatus;
detect via the management apparatus that the organization to which the user belongs requests data communication with the information processing apparatus; and
connect a virtual private network between the server and the information processing apparatus using the connection information acquired from the management apparatus,
wherein the first processor is configured to:
recognize that the virtual private network is connected between the information processing apparatus and the server; and
execute data communication with the information processing apparatus via the virtual private network,
wherein the organization information comprises connection request flag information associated with the connection information, the connection request flag information indicating presence or absence of a connection request between the server and the information processing apparatus, and
wherein the second processor is configured to:
monitor setting content of the connection request flag information;
detect that the connection request flag information is set; and
connect the virtual private network between the server and the information processing apparatus using the connection information acquired from the management apparatus after detecting that the connection request flag information is set.

2. The information processing system according to claim 1,
wherein the second processor is configured to disconnect the virtual private network after detecting that the connection request flag information is reset by monitoring the setting content of the connection request flag information.

3. The information processing system according to claim 1,
wherein the connection request flag information is set from the organization.

4. The information processing system according to claim 2,
wherein the connection request flag information is set from the organization.

5. The information processing system according to claim 1,
  wherein the organization information comprises setting control information associated with the connection request flag information and designating a timing of setting the connection request flag information, and
  wherein the third processor is configured to set the connection request flag information at the timing designated by the setting control information.

6. The information processing system according to claim 1,
  wherein the organization information comprises in-connection flag information associated with the connection information, the in-connection flag information indicating whether the virtual private network is connected, and
  wherein the second processor is configured not to connect the virtual private network when the connection request flag information is set and the in-connection flag information is set.

7. The information processing system according to claim 6,
  wherein the second processor is configured to notify the management apparatus of change content when a connection state of the virtual private network is changed, and
  wherein the third processor is configured to change setting of the in-connection flag information according to the notified change content.

8. The information processing system according to claim 7,
  wherein the third processor is configured to notify the organization of the notified change content.

9. The information processing system according to claim 1, comprising a plurality of information processing apparatuses,
  wherein the connection request flag information is set for each information processing apparatus.

10. The information processing system according to claim 5, comprising a plurality of information processing apparatuses,
  wherein the connection request flag information is set for each information processing apparatus.

11. The information processing system according to claim 1,
  wherein the second processor is configured to:
  acquire, from the management apparatus, the connection information corresponding to the organization to which the user belongs at a timing when the user logs in to the information processing apparatus; and
  connect the virtual private network between the server and the information processing apparatus using the acquired connection information.

12. The information processing system according to claim 11,
  wherein the second processor is configured to disconnect the virtual private network when the user logs out from the information processing apparatus.

13. The information processing system according to claim 1,
  wherein the information processing apparatus is an image processing apparatus.

14. A management apparatus comprising a processor, the management apparatus being included in an information processing system together with a server that is connected to a local network of an organization to which a user belongs and has a function of connecting a virtual private network and an information processing apparatus installed outside the local network, the management apparatus being installed outside the local network, the management apparatus being communicable with the server and the information processing apparatus,
  wherein the processor is configured to:
  hold organization information comprising at least connection information corresponding to the organization in the management apparatus, the connection information being used for connection to the server;
  return the connection information corresponding to the organization to which a user using the information processing apparatus belongs in response to a request from the information processing apparatus;
  cause the information processing apparatus to detect that the organization to which the user belongs requests data communication with the information processing apparatus; and
  connect the virtual private network between the server and the information processing apparatus using the returned connection information,
  wherein the organization information comprises connection request flag information associated with the connection information, the connection request flag information indicating presence or absence of a connection request between the server and the information processing apparatus, and
  wherein setting content of the connection request flag information is monitored by the information processing apparatus, and upon detecting that the connection request flag information is set, the virtual private network is connected between the server and the information processing apparatus using the connection information.

15. A non-transitory computer readable medium storing a program causing a computer constituting a management apparatus in an information processing system, the information processing system comprising a server that is connected to a local network of an organization to which a user belongs and has a function of connecting a virtual private network, an information processing apparatus installed outside the local network, and the management apparatus that is installed outside the local network and is communicable with the server and the information processing apparatus, to execute a process for enabling the server to communicate with the information processing apparatus, the process comprising:
  storing organization information corresponding to the organization, the organization information comprising at least connection information used for connection to the server,
  acquiring the connection information corresponding to the organization to which a user using the information processing apparatus belongs from the management apparatus;
  detecting via the management apparatus that the organization to which the user belongs requests data communication with the information processing apparatus; and
  connecting the virtual private network between the server and the information processing apparatus using the connection information acquired from the management apparatus, and
  the program causing a computer constituting the server to execute:
  recognizing that the virtual private network is connected; and executing data communication with the information processing apparatus via the virtual private network, wherein the organization information comprises connection request flag information associated with the connection information, the connection request flag information indicating presence or absence of a connection request between the server and the information processing apparatus, and wherein the information processing apparatus is configured to:
   monitor setting content of the connection request flag information;
   detect that the connection request flag information is set; and
   connect the virtual private network between the server and the information processing apparatus using the connection information acquired from the management apparatus after detecting that the connection request flag information is set.

\* \* \* \* \*